Patented Mar. 1, 1938

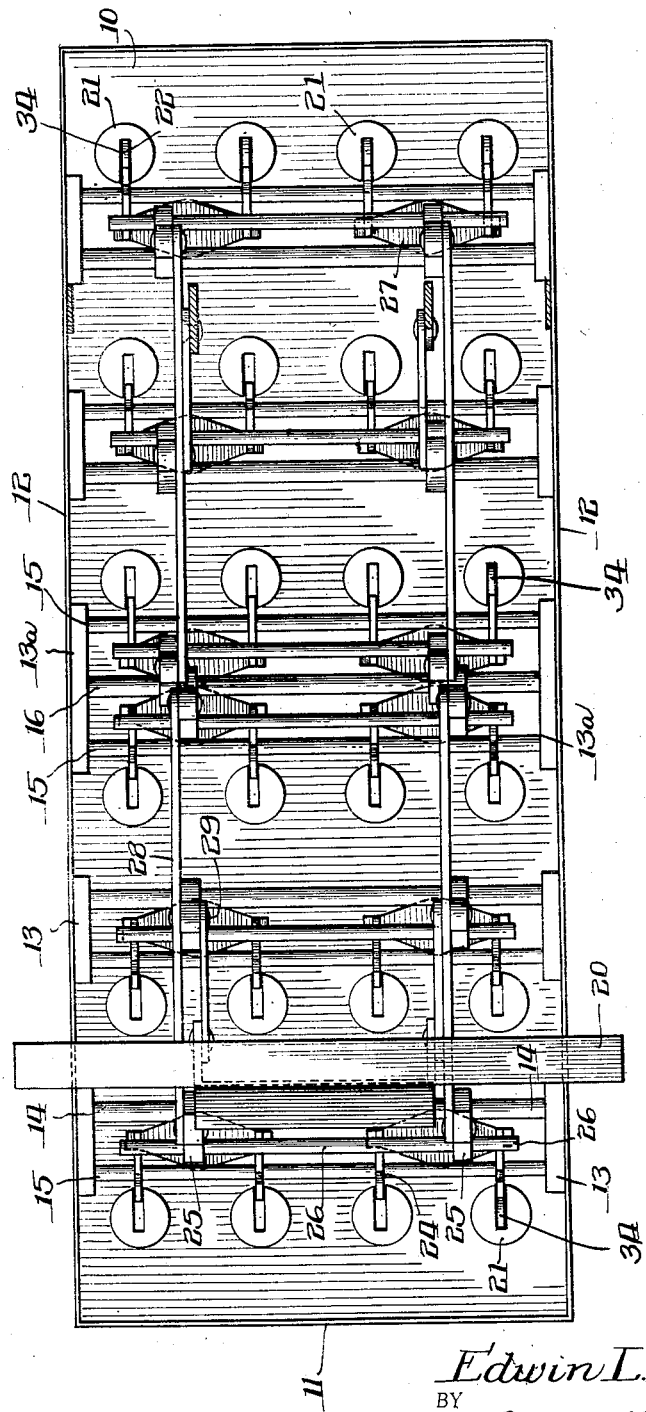

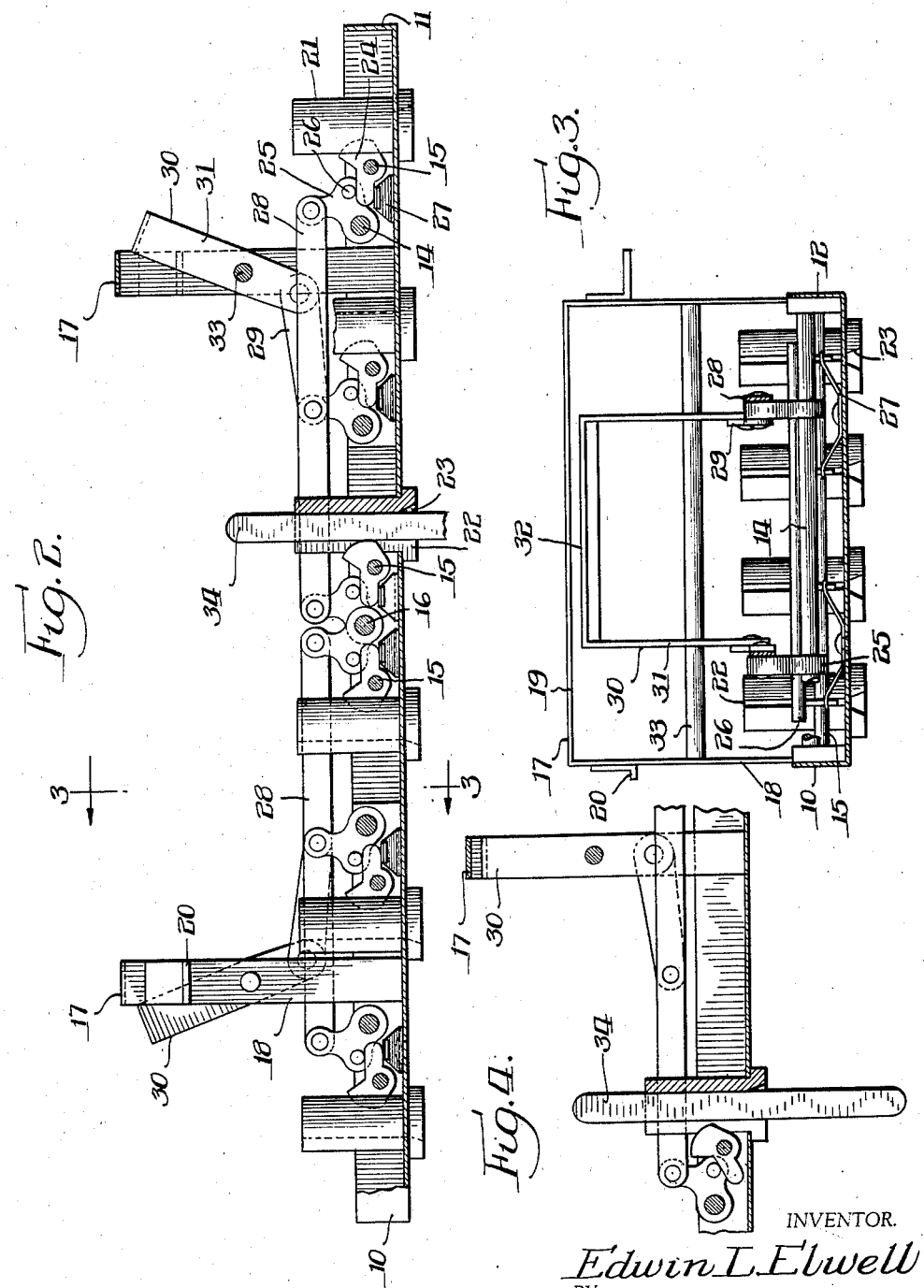

2,109,473

UNITED STATES PATENT OFFICE 2,109,473

STICK HOLDER AND DIPPING RACK

Edwin L. Elwell, Baltimore, Md., assignor to Eskimo Pie Corporation, Brooklyn, N. Y., a corporation of Delaware Application November 2, 1935, Serial No. 47,942

4 Claims. (Cl. 294—87)

The present invention relates to a stick holding member for frozen confection handles and has to do particularly with a rack suitable for grasping sticks or handles to be inserted in frozen confections and while they are being inserted, or for grasping handles already inserted into confections, and for manipulating the confections by the handles.

The objects of the invention include among others the provision of an unique means for frictionally holding confection sticks to be inserted into the confections contained in a mold or holder, a simplified and improved gripping means for frozen confection sticks, an improved holder and carrier for a plurality of sticks and frozen confections, and a novel arrangement of frame, fixed stick holder, movable stick gripping member, and operating means for simultaneously gripping a plurality of sticks or releasing such sticks.

These, and other objects which will hereinafter appear, are obtained by the novel construction, unique combination, and improved arrangement of the several elements which constitute the invention hereinafter described and claimed, one embodiment of which is illustrated in the accompanying two sheets of drawings, hereby made a part of this specification, and in which—

Figure 1 is a plan view of a device embodying the subject matter of the invention, the device being of a type suitable for use with a confection mold having twenty-four pockets;

Figure 2 is a side elevation of the device shown in Figure 1 with the side flange broken away to illustrate the locking mechanism, certain of the stick holders being shown partially in section;

Figure 3 is a transverse section of the same device taken on the line 3—3 of Figure 2; and Figure 4 is a view similar to a part of Figure 2 but showing the handle and stick holding mechanism in position to release the stick.

Like reference characters are used to designate similar parts in the drawings and in the following description.

The frame of the illustrated device comprises a pan 10 with a generally flat rectangular bottom, end flanges 11, and side flanges 12.

The pan provides a support and housing for the several operating parts. Such pan may be of any suitable weight and strength and may include a plurality of braces, not shown.

There are twenty-four apertures through the bottom of the pan 10. These are regularly spaced and arranged in six rows of four each. A sleeve 21 is seated in each aperture. Each sleeve 21 has a diametric slot 22 extending more than half way across the body of the sleeve. All of the slots are parallel.

The twelve sleeves to the right of center of Figure 1 have the slots 22 opening to the left of that figure. The twelve sleeves to the left of the center of Figure 1 have the slots 22 opening at the right of such figure.

Brackets 13 and 13a are disposed along the inside of each of the flanges 12. Brackets 13, of which there are four on each side, are of less longitudinal dimension than the two brackets 13a, one at each side at the center of the device.

Between opposed brackets 13 two transverse rods 14 and 15 extend. These may be firmly secured in brackets 13 and provide braces for the pan 10. Between the two center brackets 13a there are two rods 15, one at each end, and an intermediate rod 16, which serves the purpose of two of the rods 14, being related to the mechanism at each end of the device.

Spaced from each end of the pan 10 is a bent strap main handle 17 which has upright sections 18 and a cross bar 19. The lower ends of the upright sections 18 are firmly attached in any suitable manner to the interior of the flanges 12. On each side of the uprights 18 are L-shaped stop members 20, the lower and projecting portion of which provides a rest that limits the insertion of the entire device into a mold or into a vat containing a confection coating compound.

The lower end of slot 22 in each of the sleeves 21 is enlarged as at 23. The purpose of the enlargement 23 is to receive inaccurately positioned sticks and to provide a camming face for guiding such sticks into the slot 22.

Four stick engaging triggers 24 are pivoted upon each cross rod 15. Each trigger has a camming face which projects into the slot 22. As the camming face is lowered into the slot 22, the face projects further into the slot and is adapted to frictionally engage a confection handle or stick which has previously been inserted into such slot. Each trigger 24 has an arm at the end of the trigger away from the slot 22. Strap springs 27 suitably secured to the bottom of the pan 10 have free upwardly projecting ends which resiliently engage the under side of the trigger arms to normally urge the triggers into engagement with sticks in slots 22.

The projection of each trigger 24 inwardly of slot 22 is limited and controlled by a rod 26 which extends transversely of the apparatus. Each rod 26 is fixed near each end in apertures in two L-shaped levers 25. The lower ends of levers 25 are pivoted on the cross rods 14 in the case of the two groups toward each end, and on the common rod 16 in the case of the two centermost groups.

The top arm of each of the levers 25 is pivoted to a longitudinal strap 28. There are four straps 28. Each is pivoted to the top arm of the three levers 25 which are located toward each side and end of the device.

The levers 25 at the right hand side of the machine operate in one direction and those at the left hand side of the machine operate in the opposite direction, their positions corresponding to the positions of the stick gripping triggers 24.

For moving the straps 28 longitudinally of the apparatus, a link 29 is pivoted to the strap 28 at the pivot of the strap 28 to the middle arm 25 of each group of three arms, and to a sub-handle 30. The sub-handle 30 is U-shaped. Its legs extend downwardly and terminate at the pivotal connection to the link 29. A cross rod 33 mounted between uprights 18 of each handle 17 serves as a pivot about which each sub-handle moves. The cross portion 32 of the sub-handle moves in an arc close beneath the under side of the cross member 19 of the handle 17.

In operation, the sub-handles 30 and the camming triggers 24 are normally in the locking position, shown in Figure 2. Springs 27 maintain this position until a release is effected by pressing sub-handles 30 toward and under handles 17. When the sub-handles are so moved, the links 29 are moved to pull the straps 28 toward the end of the device. Straps 28 turn the levers 25 downward, pressing the rods 26 against the extending arm of each of the triggers. The trigger is rotated against the urge of spring 27 to withdraw the camming surface from slot 22. This position is shown in Figure 4. In Figure 2, a stick 34 is shown locked in slot 22. In Figure 4, the stick 34 is shown released.

By a slight pressure, a stick 34 may slip into and upwardly in slot 22 while the apparatus is in locking position. The upward pressure on the camming face of trigger 24 tends to move it toward a releasing position. The reverse, or downward motion, is prevented unless the sub-handles are moved to effectuate a release. Downward movement of stick 34 before the sub-handle is so actuated will tend to cause the camming surface of trigger 24 to grip tighter.

Sticks may thus be inserted into the rack from the bottom merely by pressing them into the slots. Once they are in, however, only a release in the way provided will allow them to drop from the slots. The sticks in the slots will support considerable weight so long as the sub-handles 30 are not moved to the releasing position. A plurality of confections and if necessary a confection mold as well may be picked up by placing the rack over suitably placed sticks in the confections and lowering it so that each stick enters a slot 22. The apparatus may be kept in releasing position until the sticks are in place or the rack may be pressed down on the sticks without moving sub-handle 30.

Sticks may be inserted into the rack from the tops or bottoms of slots 22 and the rack used to position the sticks in the confections in the mold. After the sticks are frictionally secured in the confections, the rack may be used to transport the confections when they are released from the mold and while the confections are being coated and hardened.

In some instances, it may be desirable to reverse the operation of the camming faces or triggers 24. In that case trigger 24 is inverted and the other parts are adjusted to fit the inverted trigger. The spring 27 then urges the trigger into the releasing position and a stick in slot 22 is gripped by moving the sub-handle 30 to beneath handle 17.

By a still further modification the trigger 24 is retained in its inverted position but the spring 27 is located either on the other side of the rod 15 or else pulling down on the arm of the trigger, rather than pushing up. Rod 26 is then placed beneath the arm of the trigger rather than over it, and the operation of the lever 25 and its associated linkage is reversed to pull rod 26 up, instead of to press it down. This is substantially a complete inversion of the device as shown in Figure 2. The triggers are urged by the spring into gripping position and the release is effected by moving the sub-handle 30, but a stick can be forced downwardly in slot 22, past the trigger 24 even in gripping position. Spring 27 must be strong enough to hold any load that will have to be carried, because in this inversion of the device the downward motion of the stick produces no locking effect. This inversion of the device may be used where the sticks are to be forced downward through the slots 22 and into the confections.

What is claimed as new and is desired to be secured by Letters Patent of the United States is:

1. A stick holder and dipping rack comprising an apertured tray, handles on said tray, gauging and suspending ears on said handles, slotted sleeves extending through the apertures in said tray adapted to accommodate a plurality of confection sticks lengthwise thereof, locking triggers operable within the slots in said sleeves, spring means urging said locking triggers into locking position, releasing levers, rods on said levers, and manually operable releasing handles associated with said first mentioned handles to actuate said releasing levers and rods and release said triggers.

2. A stick holder and dipping rack comprising an apertured tray, a slotted sleeve seated in said aperture and adapted to receive and support a confection stick for a substantial portion of the length thereof, a locking trigger pivoted to the top of said tray and operable within said slot, an arm extending oppositely from said trigger, and a spring between said arm and said tray whereby to urge said trigger into inoperative position.

3. A stick holder and dipping rack comprising an apertured tray, sleeves extending through the apertures in said tray and having slots longitudinally thereof, each adapted to receive and support a confection stick for a substantial portion of the length thereof, a locking trigger pivoted on the top of said tray and operable within said slot, a lever pivoted on the top of said tray and having a finger portion adapted to contact said trigger and retain it in inoperative position, and means above said tray for moving said lever in contact with said trigger.

4. A stick holder and dipping rack comprising an apertured tray, sleeves extending through the apertures in said tray having longitudinal slots therein adapted to accommodate a confection stick, pivoted locking triggers operable within the slots in said sleeves, control arms on said triggers, levers pivoted to the top of said tray and having contact fingers adapted to depress said control arms and retain the triggers in inoperative position, and a member pivoted to each of the levers mounted for horizontal movement to control the triggers.

EDWIN L. ELWELL.